(12) United States Patent
Wang et al.

(10) Patent No.: US 12,733,633 B2
(45) Date of Patent: Sep. 15, 2026

(54) INTELLIGENT SPRAYING DEVICE FOR PESTICIDE APPLICATION ROBOT AND SPRAYING METHOD THEREOF

(71) Applicant: Tobacco Research Institute of CAAS, Qingdao City (CN)

(72) Inventors: Xiuguo Wang, Qingdao City (CN); Tong Liu, Qingdao City (CN); Xiao Zheng, Qingdao City (CN); Wenjing Mu, Qingdao City (CN)

(73) Assignee: Tobacco Research Institute of CAAS, Qingdao City (CN)

( * ) Notice: Subject to any disclaimer, the term of this patent is extended or adjusted under 35 U.S.C. 154(b) by 410 days.

(21) Appl. No.: 18/460,809

(22) Filed: Sep. 5, 2023

(65) Prior Publication Data

US 2025/0072411 A1 Mar. 6, 2025

(51) Int. Cl.
*A01M 7/00* (2006.01)

(52) U.S. Cl.
CPC .......... *A01M 7/0042* (2013.01); *A01M 7/005* (2013.01); *A01M 7/0089* (2013.01)

(58) Field of Classification Search
CPC ... B05B 1/1672; B05B 1/3086; B05B 1/3033; B05B 1693/0438; B05B 1693/1064; A01M 7/042; A01M 7/005; A01M 7/0089
See application file for complete search history.

(56) References Cited

U.S. PATENT DOCUMENTS 2,974,882 A * 3/1961 Liston ........................ B05B 1/22 239/599
3,724,760 A * 4/1973 Smith ................... B05B 1/1672 4/596
4,850,538 A * 7/1989 Krahn ..................... B05B 1/046 239/562
5,582,742 A * 12/1996 Wilkie .................... B04B 11/06 210/781
2005/0035224 A1* 2/2005 Dodd .................... B05B 1/1672 239/548
2016/0073595 A1* 3/2016 Smith ....................... B05B 1/16 239/145
2016/0178422 A1* 6/2016 Humpal ................ A01M 7/006 239/71
2020/0113171 A1* 4/2020 Davis .................... A01M 7/005
2022/0192174 A1* 6/2022 Humpal .............. A01M 7/0057
2023/0074078 A1* 3/2023 Braun ................... B05B 1/1672
2023/0090714 A1* 3/2023 Long ...................... A01B 76/00 701/25

(Continued)

*Primary Examiner* — Joseph A Greenlund
(74) *Attorney, Agent, or Firm* — Ballard Spahr LLP

(57) ABSTRACT

The present disclosure relates to an intelligent spraying device for a pesticide application robot and a spraying method thereof. The intelligent spraying device includes a spraying assembly including push tubes connected to mounting columns, where a transport tube is welded to a side of each push tube; a spraying head is disposed on the transport tube; a plurality of mounting holes are formed in an outer periphery of the spraying head; a rotating rod is disposed in each mounting hole; one end of the rotating rod is connected to a circular fixed block and the other end thereof is connected to a first driving motor; the first driving motor is fixed to an outer side of the spraying head; an arc-shaped fan blade is disposed on the rotating rod; and the arc-shaped fan blade is driven by the rotating rod to rotate to a preset angle.

8 Claims, 5 Drawing Sheets

(56) References Cited

U.S. PATENT DOCUMENTS

| | | | | |
|---|---|---|---|---|
| 2023/0117784 | A1* | 4/2023 | Ruppert | A01M 7/0057 239/11 |
| 2023/0189783 | A1* | 6/2023 | Harmon | A01M 7/006 701/50 |
| 2023/0191436 | A1* | 6/2023 | Harmon | B05B 12/085 239/11 |
| 2023/0354798 | A1* | 11/2023 | Crowley | B05B 3/0429 |
| 2024/0149287 | A1* | 5/2024 | Funseth | B05B 1/30 |
| 2025/0072411 | A1* | 3/2025 | Wang | A01M 7/0089 |

* cited by examiner

INTELLIGENT SPRAYING DEVICE FOR PESTICIDE APPLICATION ROBOT AND SPRAYING METHOD THEREOF

TECHNICAL FIELD

The present disclosure relates to the technical field of pesticide spraying devices, and in particular, to an intelligent spraying device for a pesticide application robot and a spraying method thereof.

BACKGROUND

China is a great agricultural country. How to improve the efficiency of agricultural operation to liberate the labor force is a problem urgently needing to be solved. Especially for precision farming, intelligent agricultural machinery is highly important. Western developed countries are in the front rank in this aspect, such as American fertilizer applying robots and German field weeding robots. During agricultural production, crops are prone to being infested by plant diseases and insect pests. Spraying a pesticide is a very effective means. An existing pesticide spraying method is manual spraying, which may require lots of labor and may easily cause pesticide pollution to a worker. Moreover, pesticide spraying may be easily affected by a wind factor. When the wind factor is great, a pesticide sprayed is prone to drifting and most of the pesticide cannot be sprayed onto crops, resulting in serious pesticide waste. On the one hand, serious pesticide pollution is caused; and on the other hand, a high pesticide use cost is taken.

SUMMARY

The disclosure overcomes shortcomings of the prior art and provides an intelligent spraying device for a pesticide application robot and a spraying method thereof.

To achieve the above objective, the present disclosure adopts the following technical solutions.

A first aspect of the present disclosure provides an intelligent spraying device for a pesticide application robot, including:

- an adjustment assembly including a supporting bottom plate fixed to a pesticide application robot, where a plurality of first telescopic rods are disposed on the supporting bottom plate; other ends of the plurality of first telescopic rods are connected to a motor fixing plate; a rotating motor is disposed on the motor fixing plate; an output end of the rotating motor is connected to a rotating table; and a plurality of mounting columns are disposed on the rotating table; and
- a spraying assembly including push tubes connected to the plurality of mounting columns, where a transport tube is welded to a side of each push tube; a spraying head is disposed on the transport tube; a plurality of mounting holes are formed in an outer periphery of the spraying head; a rotating rod is disposed in each mounting hole; one end of the rotating rod is connected to a circular fixed block and the other end thereof is connected to a first driving motor; the first driving motor is fixed to an outer side of the spraying head; an arc-shaped fan blade is disposed on the rotating rod; and the arc-shaped fan blade is driven by the rotating rod to rotate to a preset angle.

Further, in a preferred embodiment of the present disclosure, the push tube has an internal thread therein and is capable of coordinating with a conveying tube such that the conveying tube is capable of a rotating motion in the push tube.

Further, in a preferred embodiment of the present disclosure, an interior of the conveying tube is of a hollow structure; a size of an input end of the conveying tube is greater than a size of an output end thereof; and the size of the input end proportionally decreases by a preset gradient along the size of the output end.

Further, in a preferred embodiment of the present disclosure, a plurality of through holes are drilled through an outer side of the conveying tube; the plurality of through holes are linearly distributed on the conveying tube; and sizes of the plurality of through holes are distributed at different gradients in a direction of rotation of the conveying tube.

Further, in a preferred embodiment of the present disclosure, a plurality of second telescopic rods are further disposed on one end of the conveying tube; other ends of the plurality of second telescopic rods are fixed to a supporting top plate; and a second driving motor is mounted on the supporting top plate and connected to the conveying tube.

Further, in a preferred embodiment of the present disclosure, a groove is formed in the supporting top plate and configured for connection with a linear moving guide rail; the linear moving guide rail is disposed on a fixed side plate; and the fixed side plate is mounted on an outer side of the push tube.

Further, in a preferred embodiment of the present disclosure, a plurality of through holes are further formed on two sides of the conveying tube and configured for communication with a liquid inlet pipe; and the liquid inlet pipe is configured for communication with an external spraying source.

Further, in a preferred embodiment of the present disclosure, the circular fixed block is fixed to a port of the transport tube.

A second aspect of the present disclosure provides a spraying method of an intelligent spraying device for a pesticide application robot, applied to the intelligent spraying device for a pesticide application robot described above and including the following steps:

- acquiring wind direction information of a current spraying operation area;
- presetting a wind direction indicator standard and establishing a database, and storing the wind direction indicator standard in the database to generate a wind direction indicator standard database;
- decomposing the wind direction information into one-dimensional direction information to generate one-dimensional vector information;
- importing the one-dimensional vector information into the wind direction indicator standard database for comparison to generate a deviation rate; and
- if the deviation rate is greater than a preset deviation rate, generating adjustment information, and transmitting the adjustment information to a control terminal for a spraying device.

Further, in a preferred embodiment of the present disclosure, the spraying method of an intelligent spraying device for a pesticide application robot further includes the following steps:

- after transmitting the adjustment information to the control terminal for a spraying device, starting the spraying device, allowing a second driving motor to drive a conveying tube to rotate for a preset number of turns, where a through hole of a preset size of the conveying tube directly faces a transport tube;

a spraying liquid entering the conveying tube through a liquid inlet pipe, passing through the through hole of the preset size of the conveying tube, and then entering the transport tube, where a first driving motor on the transport tube rotates to a preset angle based on the wind direction information; and after the first driving motor rotates to the preset angle, arc-shaped fan blades rotating to a preset angle to spray the spraying liquid out of a gap between the arc-shaped fan blades for acting on crops, thereby completing spraying operation.

The disclosure overcomes defects in the background art and has the following beneficial effects.

The present disclosure allows for acquisition of real-time image information by the pesticide application robot and adjustment of a position of the spraying assembly based on the image information to change the position of the spraying head, causing the device described herein to be adaptable to crops having different heights. On the other hand, in the present disclosure, the wind direction information of the current spraying operation area is acquired. The wind direction indicator standard is preset and the database is established, and the wind direction indicator standard is stored in the database to generate the wind direction indicator standard database. The wind direction information is decomposed into the one-dimensional direction information to generate the one-dimensional vector information. The one-dimensional vector information is imported into the wind direction indicator standard database for comparison to generate the deviation rate. If the deviation rate is greater than the preset deviation rate, the adjustment information is generated and transmitted to the control terminal for a spraying device. By adjusting the spraying direction of the spraying head and the spraying amount within the unit time based on the wind direction information, a pesticide can be sprayed onto crops as much as possible, and more pesticide can be saved as compared with the prior art. Moreover, the present disclosure allows for adjustment of a spraying speed within a unit time based on wind strength such that the influence of a wind factor on a sprayed pesticide is reduced, thereby increasing the pesticide utilization rate.

BRIEF DESCRIPTION OF THE DRAWINGS

To describe the technical solutions in the embodiments of the present disclosure or in the prior art more clearly, the accompanying drawings required for describing the embodiments or the prior art will be described briefly below. Apparently, the accompanying drawings in the following description show some embodiments of the present disclosure, and a person of ordinary skill in the art may still derive other drawings from these accompanying drawings without creative efforts.

LIST OF REFERENCE NUMERALS

Figure 1:
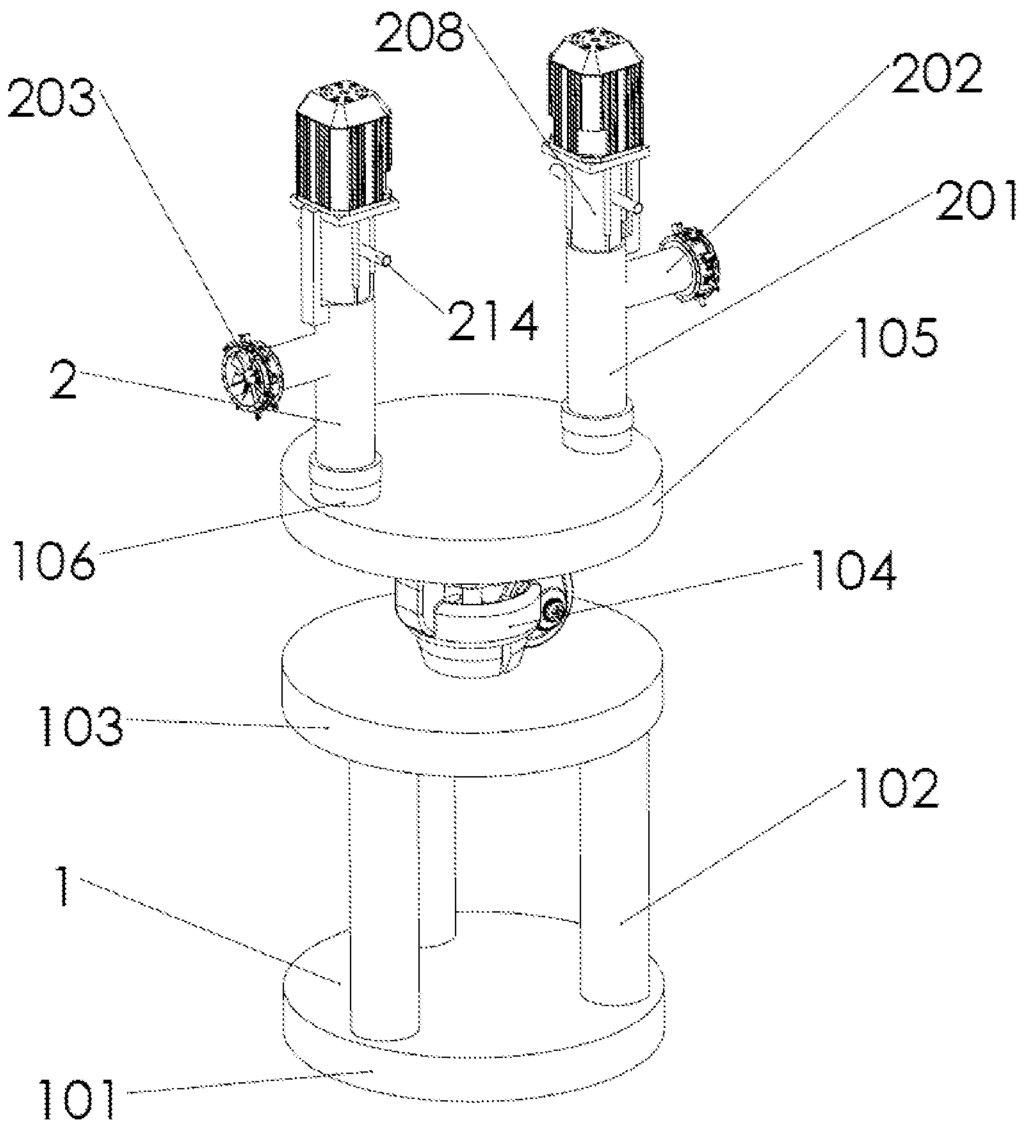
FIG. 1 illustrates an overall structural schematic diagram of an intelligent spraying device for a pesticide application robot.
Figure 2:
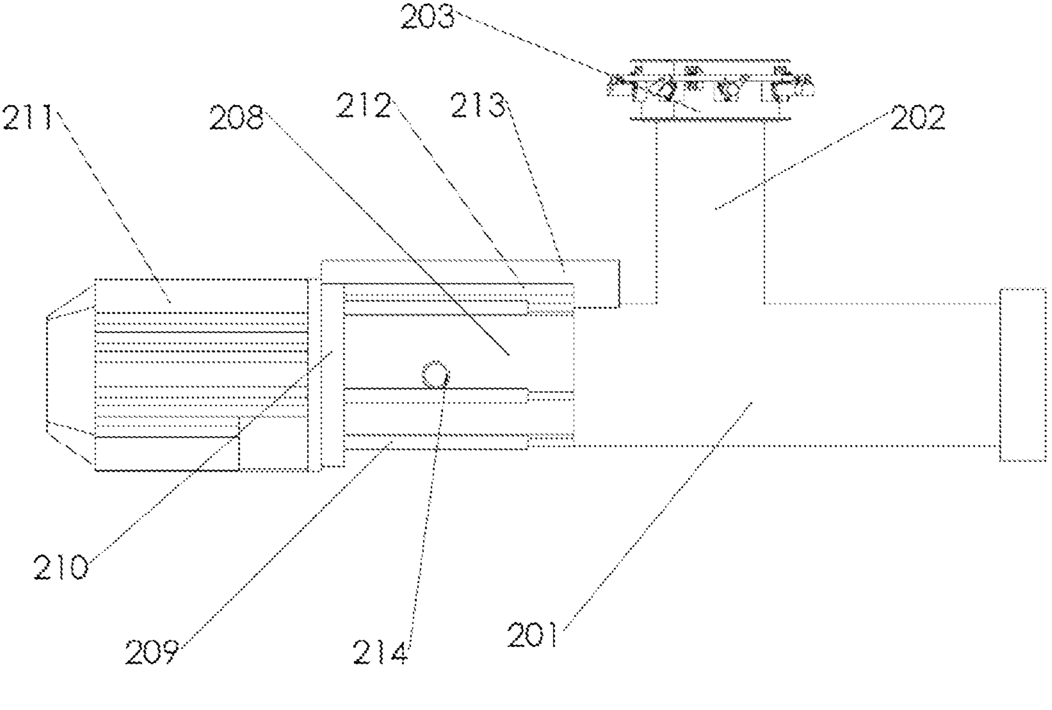
FIG. 2 illustrates a front structural schematic diagram of an intelligent spraying device for a pesticide application robot.
Figure 3:
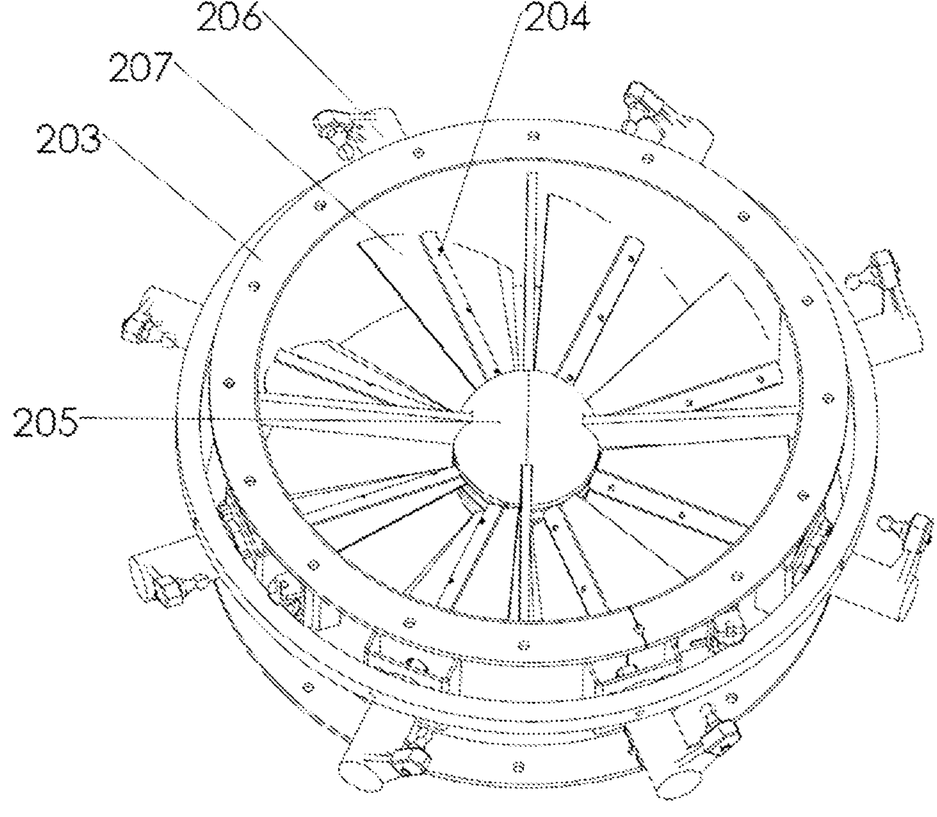
FIG. 3 illustrates a partial structural schematic diagram of a spraying assembly.
Figure 4:
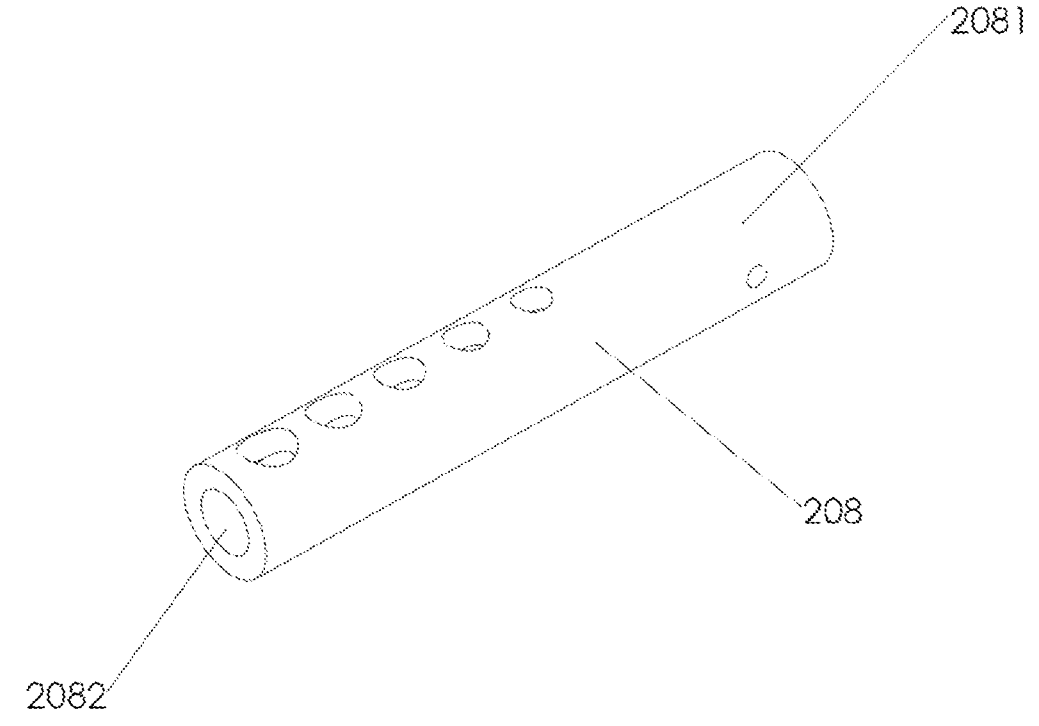
FIG. 4 illustrates a partial structural schematic diagram of a spraying assembly.
Figure 5:
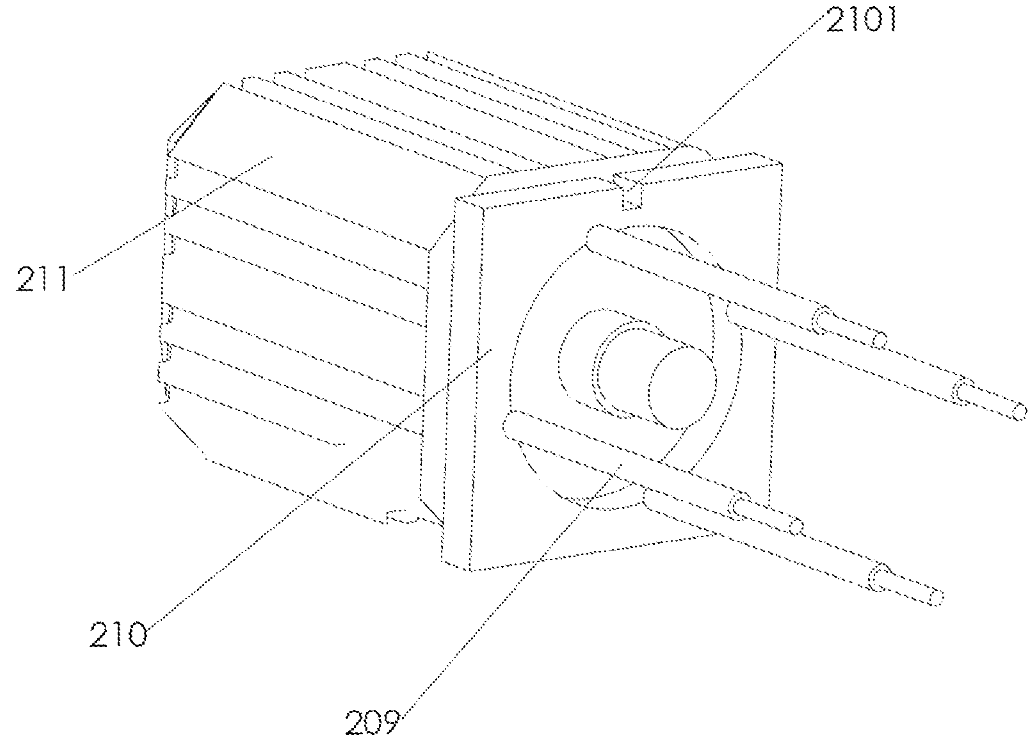
FIG. 5 illustrates a cross-sectional structural schematic diagram of a spraying assembly.

1—adjustment assembly, 2—spraying assembly, 101—supporting bottom plate, 102—first telescopic rod, 103—motor fixing plate, 104—rotating motor, 105—rotating table, 106—mounting column, 201—push tube, 202—transport tube, 203—spraying head, 204—rotating rod, 205—circular fixed block, 206—first driving motor, 207—arc-shaped fan blade, 208—conveying tube, 2081—input end, 2082—output end, 209—second telescopic rod, 210—supporting top plate, 2101—groove, 211—second driving motor, 212—linear moving guide rail, 213—fixed side plate, and 214—liquid inlet pipe.

DETAILED DESCRIPTION OF THE EMBODIMENTS

In order to understand the above objectives, features, and advantages of the present disclosure more clearly, the present disclosure will be further described in detail below in conjunction with the accompanying drawings and the specific embodiments. These drawings are simplified schematic diagrams which only illustrate basic structures of the disclosure in a schematic manner, and therefore only show constitutions related to the disclosure. It should be noted that the embodiments of the present disclosure and the features of the embodiments can be combined with one another to derive new embodiments without conflict.

It should be understood that in the description of the present disclosure, terms such as “center”, “longitudinal”, “transverse” “upper”, “lower”, “front”, “rear”, “left”, “right”, “vertical”, “horizontal”, “top”, “bottom”, “inside” and “outside” indicate the orientation or position relationships based on the drawings. They are merely intended to facilitate description of the present disclosure, rather than to indicate or imply that the mentioned device or elements must have a specific orientation and must be constructed and operated in a specific orientation. Therefore, these terms should not be construed as a limitation to the present disclosure. Moreover, the terms such as “first” and “second” are used only for the purpose of description and cannot be understood as indicating or implying relative importance or implicitly indicating the number of technical features indicated. Thus, features defined with “first” and “second” may explicitly or implicitly include one or more of the features. In the description of the present disclosure, unless otherwise specifically defined, “a plurality of” means two or more.

In the description of the present disclosure, it should be noted that, unless otherwise clearly specified and limited, meanings of terms “install”, “connected with”, and “connected to” should be understood in a board sense. For example, the connection may be a fixed connection, a removable connection, or an integral connection; may be a mechanical connection or an electrical connection; may be a direct connection or an indirect connection by using an intermediate medium; or may be intercommunication between two components. A person of ordinary skill in the art may understand specific meanings of the foregoing terms in the present disclosure based on a specific situation.

To facilitate the understanding of the present disclosure, the present disclosure is described more completely below with reference to the accompanying drawings. Some preferred embodiments of the present disclosure are illustrated in the accompanying drawings. However, the present disclosure can be implemented in many different forms and is not limited to the embodiments described herein. Rather, these embodiments are provided so that the contents of the present disclosure can be understood more thoroughly and comprehensively.

As shown in FIG. 1, the first aspect of the present disclosure provides an intelligent spraying device for a pesticide application robot, including an adjustment assembly 1 and a spraying assembly 2.

The adjustment assembly 1 includes a supporting bottom plate 101 fixed to a pesticide application robot. A plurality of first telescopic rods 102 are disposed on the supporting bottom plate 101. Other ends of the plurality of first telescopic rods 102 are connected to a motor fixing plate 103. A rotating motor 104 is disposed on the motor fixing plate 103. An output end of the rotating motor 104 is connected to a rotating table 105. A plurality of mounting columns 106 are disposed on the rotating table 105.

It needs to be noted that an image acquisition system, such as a camera, is disposed in a pesticide application robot in the prior art. Since the adjustment assembly 1 is disposed on the pesticide application robot, a height of current plants is acquired by the image acquisition system, and then a length of the first telescopic rod 102 is adjusted for spraying in a height direction based on the height of the plants. This allows for adaptation to different heights of plants. Moreover, during spraying, by adjusting the rotation position of the rotating motor 104, the rotating motor 104 is caused to drive the rotating table 105 to rotate a certain angle. Thus, more spraying requirements can be met.

As shown in FIG. 2 to FIG. 5, the spraying assembly 2 includes push tubes 201 connected to the plurality of mounting columns 106. A transport tube 202 is welded to a side of each push tube 201. A spraying head 203 is disposed on the transport tube 202. A plurality of mounting holes are formed in an outer periphery of the spraying head 203. A rotating rod 204 is disposed in each mounting hole. One end of the rotating rod 204 is connected to a circular fixed block 205 and the other end thereof is connected to a first driving motor 206. The first driving motor 206 is fixed to an outer side of the spraying head 203. An arc-shaped fan blade 207 is disposed on the rotating rod 204. The arc-shaped fan blade 207 is driven by the rotating rod 204 to rotate to a preset angle.

Further, in a preferred embodiment of the present disclosure, a plurality of through holes are further formed on two sides of the conveying tube 208 and configured for communication with a liquid inlet pipe 214. The liquid inlet pipe 214 is configured for communication with an external spraying source.

It needs to be noted that a spraying liquid enters the conveying tube 208 through the liquid inlet pipe 214, further enters the transport tube 202 through the conveying tube 208, and enters the spraying head 203 after passing through the transport tube 202. At this time, wind information at a current location is acquired by a wind direction monitor on the pesticide application robot, and the wind information is decomposed into one or more one-dimensional vectors. The first driving motor 206 is driven based on a wind direction. The first driving motor 206 drives the rotating rod 204 and the arc-shaped fan blade 207 on the rotating rod is driven such that a certain angle is formed between the arc-shaped fan blades 207, causing the spraying liquid to be sprayed out of the spraying head 203 at a certain angle. Thus, the spraying liquid is caused to change with the change of the wind direction so that the spraying liquid can be sprayed onto crops as much as possible. On the other hand, by adjusting the rotation position of the rotating motor 104, the rotating motor 104 is caused to drive the rotating table 105 to rotate a certain angle so that the spraying liquid can be sprayed onto crops as much as possible.

Further, in a preferred embodiment of the present disclosure, the push tube 201 has an internal thread therein and is capable of coordinating with the conveying tube 208 such that the conveying tube 208 is capable of a rotating motion in the push tube 201.

Further, in a preferred embodiment of the present disclosure, an interior of the conveying tube 208 is of a hollow structure; a size of an input end 2081 of the conveying tube 208 is greater than a size of an output end 2082 thereof; and the size of the input end 2081 proportionally decreases by a preset gradient along the size of the output end 2082.

Further, in a preferred embodiment of the present disclosure, a plurality of through holes are drilled through an outer side of the conveying tube 208; the plurality of through holes are linearly distributed on the conveying tube 208; and sizes of the plurality of through holes are distributed at different gradients in a direction of rotation of the conveying tube 208.

Further, in a preferred embodiment of the present disclosure, a plurality of second telescopic rods 209 are further disposed on one end of the conveying tube 208; other ends of the plurality of second telescopic rods 209 are fixed to a supporting top plate 210; and a second driving motor 211 is mounted on the supporting top plate 210 and connected to the conveying tube 208.

Further, in a preferred embodiment of the present disclosure, a groove 2101 is formed in the supporting top plate 210 and configured for connection with a linear moving guide rail 212; the linear moving guide rail 212 is disposed on a fixed side plate 213; and the fixed side plate 213 is mounted on an outer side of the push tube 201.

It needs to be noted that, on the other hand, when wind is strong, after the spraying liquid enters the push tube 201, the conveying tube 208 is driven by the second driving motor 211 to move, and when the conveying tube 208 rotates for a certain number of turns, one through hole of the conveying tube 208 is aligned to the conveying tube 208 in position. The rotation of the conveying tube 208 causes the second telescopic rod 209 to lengthen or shorten, and the supporting top plate 210 moves along with the movement of the linear moving guide rail 212 such that one through hole of the conveying tube 208 is aligned to the conveying tube 208 in position and the remaining through holes of the conveying tube 208 are plugged. The stronger the external wind, the smaller one through hole of the conveying tube 208. In the case of a certain spraying liquid amount transported within a unit time, one through hole of the conveying tube 208 is small, and the spraying liquid is pressurized based on the wind factor. This operation enables reduction of the influence of the wind factor on the spraying liquid. On the other hand, the interior of the conveying tube 208 is of the hollow structure; the size of the input end 2081 of the conveying tube 208 is greater than the size of the output end 2082 thereof; and the size of the input end 2081 proportionally decreases by the preset gradient along the size of the output end 2082. The technical features provide a first pressurization for the spraying liquid. A plurality of through holes are drilled through the outer side of the conveying tube 208; the plurality of through holes are linearly distributed on the conveying tube 208; and sizes of the plurality of through holes are distributed at different gradients in the direction of rotation of the conveying tube 208, thus allowing for a secondary pressurization for the spraying liquid. With multiple pressurizations, a spraying speed of the spraying liquid is changed, allowing for adaptation to influences of more wind factors, and the spraying liquid can be sprayed onto crops as much as possible, thus utilizing pesticide resources as much as possible and avoiding wasting of the pesticide resources.

Further, in a preferred embodiment of the present disclosure, the circular fixed block 205 is fixed to a port of the transport tube 202.

The second aspect of the present disclosure provides a spraying method of an intelligent spraying device for a pesticide application robot, applied to the intelligent spraying device for a pesticide application robot described above and including the following steps.

S102: wind direction information of a current spraying operation area is acquired.

S104: a wind direction indicator standard is preset and a database is established, and the wind direction indicator standard is stored in the database to generate a wind direction indicator standard database.

S106: the wind direction information is decomposed into one-dimensional direction information to generate one-dimensional vector information.

S108: the one-dimensional vector information is imported into the wind direction indicator standard database for comparison to generate a deviation rate.

S110: if the deviation rate is greater than a preset deviation rate, adjustment information is generated and transmitted to a control terminal for a spraying device.

It needs to be noted that the wind direction monitor disposed on the pesticide application robot or a remote spraying terminal provides the wind direction information, where the wind direction information includes at least wind strength and a wind direction. When the deviation rate is greater than the preset deviation rate, it indicates that the wind direction information has an influence on the spraying operation at this time. At this time, the second driving motor is driven by the control terminal for a spraying device. By the first pressurization of the conveying tube and the second pressurization provided by the through hole of the preset size of the conveying tube directly facing the transport tube, the first driving motor on the transport tube rotates to a preset angle based on the wind direction information. After the first driving motor rotates to the preset angle, the arc-shaped fan blades rotate to a preset angle such that the spraying liquid is sprayed out of a gap between the arc-shaped fan blades for acting on crops, and the spraying operation is completed. The wind direction indicator standard can be construed as a wind range which is preset by a user and does not need to be adjusted.

Further, in a preferred embodiment of the present disclosure, the spraying method of an intelligent spraying device for a pesticide application robot further includes the following steps.

S112: after the adjustment information is transmitted to the control terminal for a spraying device, the spraying device is started, allowing a second driving motor to drive a conveying tube to rotate for a preset number of turns, where a through hole of a preset size of the conveying tube directly faces a transport tube.

S114: a spraying liquid enters the conveying tube through a liquid inlet pipe, passes through the through hole of the preset size of the conveying tube, and then enters the transport tube, where a first driving motor on the transport tube rotates to a preset angle based on the wind direction information.

S116: after the first driving motor rotates to the preset angle, arc-shaped fan blades rotate to a preset angle to spray the spraying liquid out of a gap between the arc-shaped fan blades for acting on crops, thereby completing spraying operation.

In conclusion, the present disclosure allows for acquisition of real-time image information by a pesticide application robot and adjustment of a position of a spraying assembly based on the image information to change the position of a spraying head, causing the device described herein to be adaptable to crops having different heights.

On the other hand, in the present disclosure, the wind direction information of the current spraying operation area is acquired. The wind direction indicator standard is preset and the database is established, and the wind direction indicator standard is stored in the database to generate the wind direction indicator standard database. The wind direction information is decomposed into the one-dimensional direction information to generate the one-dimensional vector information. The one-dimensional vector information is imported into the wind direction indicator standard database for comparison to generate the deviation rate. If the deviation rate is greater than the preset deviation rate, the adjustment information is generated and transmitted to the control terminal for a spraying device. By adjusting the spraying direction of the spraying head and the spraying amount within the unit time based on the wind direction information, a pesticide can be sprayed onto crops as much as possible, and more pesticide can be saved as compared with the prior art. Moreover, the present disclosure allows for adjustment of a spraying pressure for a spraying liquid within the unit time based on wind strength such that the influence of a wind factor on a sprayed pesticide is reduced, thereby increasing the pesticide utilization rate.

Moreover, it should be understood that although this description is made in accordance with the embodiments, not every embodiment includes only one independent technical solution. Such a description is merely for the sake of clarity, and those skilled in the art should take the description as a whole. The technical solutions in the embodiments can also be appropriately combined to form other embodiments which are comprehensible for those skilled in the art.

Based on the above ideal embodiments of the present disclosure as inspiration and the above description, relevant personnel can make various changes and modifications within the scope of the technical idea of the present disclosure. The technical scope of the present disclosure is not limited to the content of the description, and should be determined according to the scope of the claims.

What is claimed is:

1. A spraying method of an intelligent spraying device for a pesticide application robot, the spraying method comprising:

acquiring wind direction information of a current spraying operation area;

presetting a wind direction indicator standard and establishing a database, and storing the wind direction indicator standard in the database to generate a wind direction indicator standard database;

decomposing the wind direction information into one-dimensional direction information to generate one-dimensional vector information;

importing the one-dimensional vector information into the wind direction indicator standard database for comparison to generate a deviation rate;

if the deviation rate is greater than a preset deviation rate, generating adjustment information, and transmitting the adjustment information to a control terminal for a spraying device, after transmitting the adjustment information to the control terminal for a spraying device, starting the spraying device, allowing a second driving motor to drive a conveying tube to rotate for a preset number of turns, wherein a through hole of a preset size of the conveying tube directly faces a transport tube;

a spraying liquid entering the conveying tube through a liquid inlet pipe, passing through the through hole of the preset size of the conveying tube, and then entering the transport tube, wherein a first driving motor on the transport tube rotates to a preset angle based on the wind direction information; and after the first driving motor rotates to the preset angle, arc-shaped fan blades rotating to a preset angle to spray the spraying liquid out of a gap between the arc-shaped fan blades for acting on crops, thereby completing spraying operation.

2. The spraying method according to claim 1, wherein a push tube has an internal thread therein and is capable of coordinating with a conveying tube such that the conveying tube is capable of a rotating motion in the push tube.

3. The spraying method according to claim 2, wherein an interior of the conveying tube is of a hollow structure; a size of an input end of the conveying tube is greater than a size of an output end thereof; and the size of the input end proportionally decreases by a preset gradient along the size of the output end.

4. The spraying method according to claim 2, wherein a plurality of through holes are drilled through an outer side of the conveying tube; the plurality of through holes are linearly distributed on the conveying tube; and sizes of the plurality of through holes are distributed at different gradients in a direction of rotation of the conveying tube.

5. The spraying method according to claim 2, wherein a plurality of second telescopic rods are further disposed on one end of the conveying tube; other ends of the plurality of second telescopic rods are fixed to a supporting top plate; and a second driving motor is mounted on a supporting top plate and connected to the conveying tube.

6. The spraying method according to claim 5, wherein a groove is formed in the supporting top plate and configured for connection with a linear moving guide rail; the linear moving guide rail is disposed on a fixed side plate; and the fixed side plate is mounted on an outer side of the push tube.

7. The spraying method according to claim 2, wherein a plurality of through holes are further formed on two sides of the conveying tube and configured for communication with a liquid inlet pipe; and the liquid inlet pipe is configured for communication with an external spraying source.

8. The spraying method according to claim 1, wherein a circular fixed block is fixed to a port of the transport tube.

* * * * *